Feb. 15, 1944.   W. R. DAND   2,341,531
MULTIPLE INLET VALVE
Filed Dec. 23, 1941   2 Sheets-Sheet 1

INVENTOR.
WILLIAM RODERICK DAND
BY
ATTORNEYS

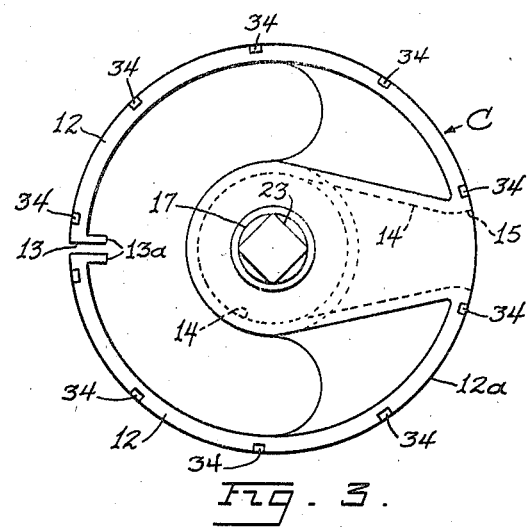
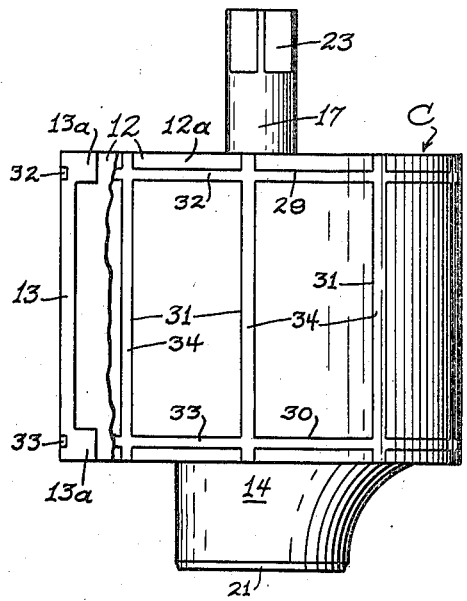
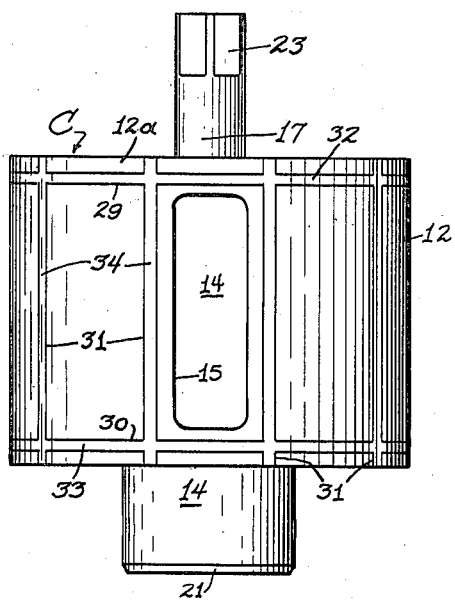

Patented Feb. 15, 1944

2,341,531

UNITED STATES PATENT OFFICE 2,341,531

MULTIPLE INLET VALVE

William Roderick Dand, Los Angeles, Calif., assignor to Nellie L. Stephens, San Francisco, Calif., doing business as U. S. Flexible Metallic Tubing Co.

Application December 23, 1941, Serial No. 424,150

7 Claims. (Cl. 251—107)

An object of my invention is to provide a multiple inlet valve which has a liquid-tight joint between the rotor and valve casing. To this end I provide the rotor with a split sleeve or cylindrical body that will cause the wall of the sleeve to contact with the valve body or stator wall in a yielding manner to make a tight joint between the parts while permitting the rotor to move. In order to make the contacting surfaces between the rotor and stator liquid tight, I have provided cup-shaped sealing members and sealing inserts and mount them between the rotor and stator at various places. These members may be made of any desired material that will act as effective liquid seals. I have found that Neoprene is admirably adapted for such use.

A further object of my invention is to provide a device of the type described which is simple in construction and durable and efficient for the purpose intended.

Other objects and advantages will appear in the following specification, and the novel features of the device will be particularly pointed out in the appended claims.

My invention is illustrated in the accompanying drawings forming a part of this application, in which:

Figure 3 is a plan view of the valve rotor;

Figure 4 is a side elevation of Figure 3 with a portion of the rotor broken away for clarity; and Figure 5 is a front elevation of Figure 3 and illustrates the port in the rotor.

While I have shown only the preferred form of my invention, it should be understood that various changes or modifications may be made within the scope of the appended claims without departing from the spirit of the invention.

In carrying out my invention, I will first describe the valve casing and then the valve rotor.

Valve body

Figure 1:
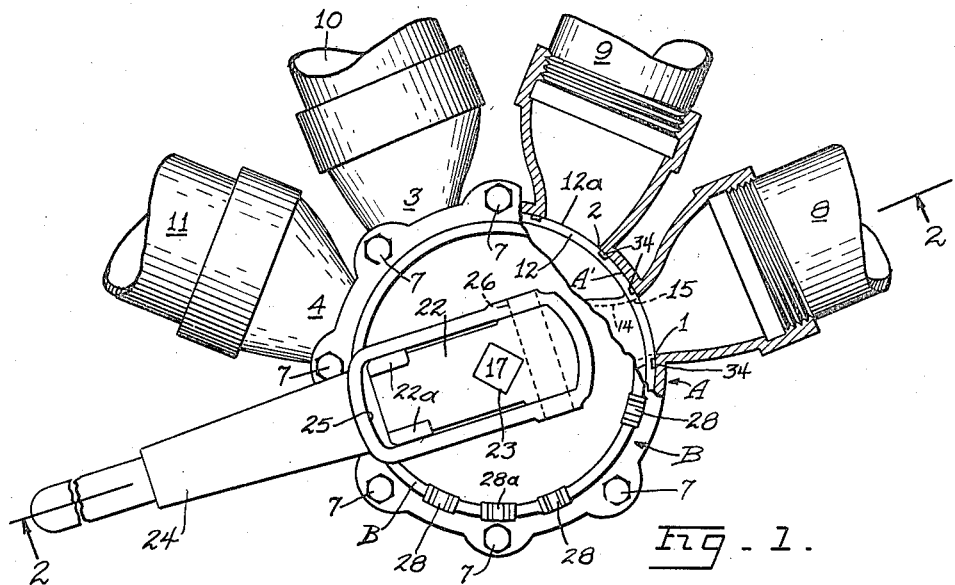
Figure 1 is a plan view of the device, portions being shown in section for clarity.

The valve body or stator is indicated generally at A and this stator has a plurality of inlet ports shown at 1, 2, 3 and 4 in Figure 1. It is obvious that the number of inlet ports may be increased or decreased at will. The top of the casing is closed by a cover, indicated generally at B, and the bottom of the casing has an outlet opening 5 which is threaded to receive the threaded end of an outlet pipe 6. The cover B may be secured to the casing by any suitable means such as by cap screws 7. Figure 1 shows how the ports 1 to 4 inclusive have enlarged interiorly threaded ends that receive the threaded ends of inlet pipes 8 to 11 inclusive. Although I describe the valve as having inlet ports 1 to 4 inclusive and as having an outlet opening 5, it is obvious that the flow of the liquid through the valve may be in a reverse direction, and in that event the pipe 6 will constitute an inlet pipe and the pipes 8 to 11 inclusive will constitute outlet pipes.

The casing or stator A has a cylindrical portion for receiving a valve rotor indicated generally at C. The ends of the rotor ride on the annular rib 5a and against the cover B.

Valve rotor

The particular construction of the rotor is shown in Figures 2 to 5 inclusive and it will be noted that the rotor has a cylindrical wall or sleeve 12 which is split longitudinally at 13. The rotor has a curved conduit 14, see Figure 2, which has an inlet port 15 that is adapted to register with any one of the four inlets 1 to 4 inclusive. The conduit 14 has an outlet end 16 that is concentric with the rotor axis and registers with the casing outlet 5. The casing outlet 5 is axially aligned with the rotor axis. When the conduit 14 therefore registers with the port 1, for example, fluid will flow through the inlet pipe 8 into the valve and out through the pipe 6, or the fluid may flow in a reverse direction.

The means for rotating the valve rotor will now be described. The valve rotor carries a shaft 17 that projects through a bearing 18 that is disposed at the center of the cover B. The cover B has a downwardly extending annular flange 19 concentric with the bearing and spaced from the shaft a slight distance. An annular recess is formed by the flange and receives a cup-shaped gasket 19. The gasket bears against the shaft for forming a liquid tight seal between the cover and shaft. I have found that the cup-shaped member when made of neoprene will form an effective seal.

The conduit 14 has its outer end 16 projecting beyond the split sleeve 12 and rotatably received in a lower cup-shaped gasket 20 that is also made of neoprene. The gasket 20 is supported by the casing A and bears against the exterior end of the conduit 14. The conduit 14 has an outer chamfered end 21 that bears against the cup 20. I have described how the top and the bottom of the rotor are rotatably supported by the casing A and are sealed by upper and lower neoprene cup-shaped gaskets so as to prevent leakage past the bearing supports.

The means for rotating the rotor into the desired positions comprises a fulcrum block 22 that is mounted on the square end 23 of the shaft 17. A valve lever 24 has a slot 25 for receiving the fulcrum block and a fulcrum pin 26 is passed through aligned openings in the lever and block for pivotally securing the lever to the block. A depending finger 27 is carried by the lever and is adapted to enter any one of a number of notches 28 formed in an upstanding flange B' carried by the cover. There is a notch or recess 28 associated with each of the inlet ports 1 to 4 inclusive and the associate recesses are disposed diametrically across from the inlets.

Figure 2:
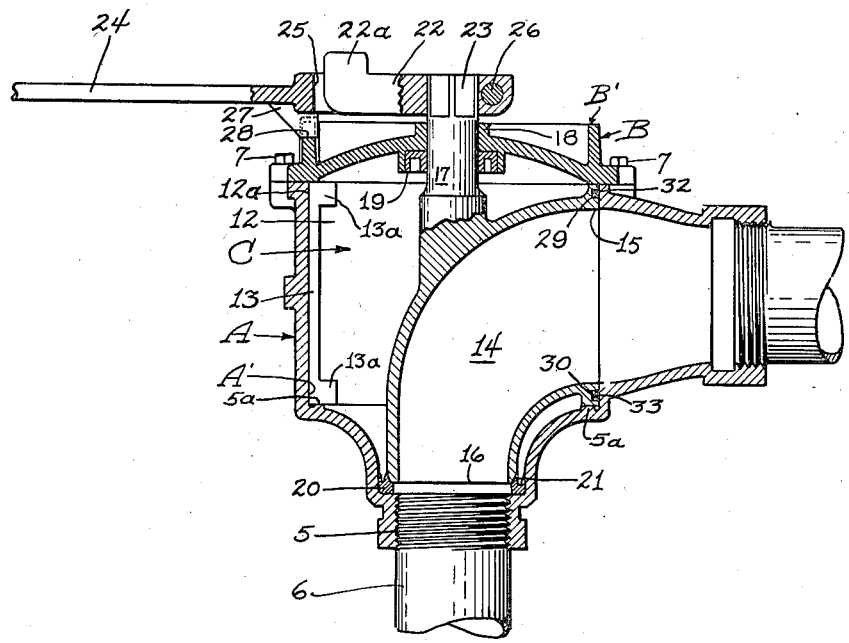
Figure 2 is a vertical section taken substantially along the line 2—2 of Figure 1.

In shifting the rotor from one port to another, the lever 24 is raised and swung in a clockwise direction about the fulcrum pin 26 when looking at Figure 2, and this will free the finger 27 from its notch 28. The block 22 has a raised portion 22a engageable by the lever when the lever is raised. The lever when raised is held in its raised position and is swung through an arc for rotating the rotor into the desired position. It will be noted from Figure 1 that the port 15 in the rotor is aligned with the longitudinal axis of the lever 24 and therefore if the operator wishes the port 2, for example, to be placed in communication with the valve, he merely swings the lever 24 until the fulcrum end points in the direction of the port 2. After this movement is effected, the valve lever 24 is lowered and the finger 27 will drop into the notch 28 so as to register the port 15 with the port 2. The notch 28 has inclined sides for centering the finger 27 as it is lowered into resting position.

One of the novel features of my invention is to provide a sealing means between the contacting rotor and stator walls. Part of the sealing means is the split sleeve 12 which will have a tendency to expand and this will cause the outer wall 12a of the sleeve to contact with the inner wall A' of the stator. In addition to the snug contact between the walls, I provide sealing means therebetween. The outer wall 12a has two annular grooves 29 and 30 formed therein, see Figures 4 and 5, that encircle the rotor sleeve. In addition, longitudinal grooves 31 are formed in the rotor at spaced intervals, and two of these are disposed along the sides of the port 15, see Figure 5. Figure 3 illustrates how the grooves 31 that are spaced around the cylindrical surface 12a are arranged in a position where they will bound the sides of the ports 1 to 4 inclusive when the rotor is at rest, and this is irrespective of the particular position the rotor assumes in the stator so long as the finger 27 is received in one of the recesses. The grooves 29, 30 and 31 receive sealing inserts 32, 33 and 34 respectively and these inserts are preferably made of neoprene. Figure 5 illustrates how the inserts extend around the four sides of the port 15, and the other inserts 34 cooperating with the annular inserts 32 and 33 will form sealing means around each of the intake ports 1 to 4 inclusive. This sealing means will be disposed around each inlet port irrespective of the particular position of the valve rotor. The tendency of the split sleeve 12 to enlarge itself will move the inserts 32 to 34 inclusive against the inner wall A' and effect a perfect liquid tight seal. It is this feature that makes the valve leak proof in operation.

Operation

In mounting the rotor in the valve body, lugs 13a, carried by the split sleeve and disposed adjacent to the slot 13, are grasped and moved toward each other by a suitable tool. This will shrink the diameter of the sleeve to permit its ready insertion into the valve body. The lugs are freed after the rotor is inserted in the valve body. The cap or cover B is now secured in place after which the lever 24 and fulcrum block are secured to the shaft 17. The device is ready for use.

One of the principal uses of the device is in oil trucks that carry different kinds of gasoline and lubricants to a service station. The various tanks on the truck are connected to the valve by the pipes 8 to 11 inclusive. These pipes may have shut off valves of their own. The pipe 6 may connect with a hose that leads to the desired tank in the service station. It is the usual practice to connect the pipe 6 to a metering device (not shown) and then connect the hose (not shown) to the metering device. Any one of four different kinds of liquid may be passed through the valve and into the pipe 6. The valve will remain in a liquid tight seal between the valve body and valve rotor throughout the life of the device. It should be noted that the valve rotor C is in closed position when the finger 27 is received in the recess 28a. The rotor port 15 will be positioned between the inlet ports 2 and 3 when the rotor is in this position and this will close the valve.

The split sleeve 12 and the sealing inserts 32, 33 and 34 carried by the sleeve cooperate to produce a liquid tight seal between the walls 12a and A' of the selector valve. The split sleeve not only yieldingly holds the rotor surface 12a against the stator surface A', but also compensates for any variation in expansion and contraction ratios between the rotor and the stator caused by internal temperature changes or external temperature changes. For example, the fluid temperature might change and this might result in expansion or contraction of the rotor to a possibly greater degree than that experienced by the stator. The split sleeve would take care of this change in size. Also if the atmospheric temperature should change, this would result in the casing expanding or contracting possibly more rapidly than the rotor. Again the split sleeve would compensate for these unequal changes. Where the rotor is made of one metal and the stator of another, these metals having different coefficients of expansion, the split sleeve becomes vital to a perfect liquid tight seal between the rotor and stator when internal or external temperature changes take place.

I claim:

1. A multiple inlet valve comprising a stator having a cylindrical-shaped portion with ports in the wall thereof, a rotor having a split cylindrical portion rotatably mounted in the cylindrical portion of the stator and yieldingly contacting with the cylindrical wall at all times to form a liquid tight seal between the parts, said rotor having a conduit with a port, the conduit being separate from the split cylinder except where the rotor port is formed, the rotor port adapted to be brought into registration with any one of the stator ports, and means for swinging the rotor into the desired position, the split in the rotor cylinder being located diametrically opposite to the rotor port and the stator ports never registering with the split.

2. A multiple inlet valve comprising a stator having a cylindrical-shaped portion with ports in the wall thereof, a rotor having a split cylindrical portion rotatably mounted in the cylindrical portion of the stator and yieldingly contacting with the cylindrical wall at all times, said rotor having a conduit with a port, the conduit being separate from the split cylinder except where the rotor port is formed, the rotor port adapted to be brought into registration with any one of the stator ports, sealing inserts encircling the rotor near the top and bottom and contacting with the inner cylindrical surface of the stator, additional sealing inserts disposed along the sides of the rotor port and contacting with the stator wall to cooperate with the circular inserts for forming a liquid tight fit between the registering rotor and stator ports, and means for swinging the rotor into the desired position, the split in the rotor cylinder being located diametrically opposite to the rotor port and the stator ports never registering with the split.

3. A multiple inlet valve comprising a stator having a cylindrical-shaped portion with ports in the wall thereof, a rotor having a split cylindrical portion rotatably mounted in the cylindrical portion of the stator and yieldingly contacting with the cylindrical wall at all times, said rotor having a conduit with a port, the conduit being separate from the split cylinder except where the rotor port is formed, the rotor port adapted to be brought into registration with any one of the stator ports, sealing inserts encircling the rotor near the top and bottom and contacting with the inner cylindrical surface of the stator, additional sealing inserts disposed along the sides of the rotor port and contacting with the stator wall to cooperate with the circular inserts for forming a liquid tight fit between the registering rotor and stator ports, and means for swinging the rotor into the desired position, the split in the rotor cylinder being located diametrically opposite to the rotor port and the stator ports never registering with the split, said rotor having additional sealing inserts paralleling the second-named inserts and extending along the sides of the unused stator ports, the split rotor portion yieldingly holding these last named inserts in sealing contact with the stator wall.

4. A multiple inlet valve comprising a stator having a cylindrical-shaped portion with ports in the wall thereof and a port in one end, a rotor having a cylindrical portion mounted in the cylindrical stator portion and having a port in its cylindrical portion adapted to be brought into registration with the desired stator wall port, said rotor having a conduit communicating with the port in the stator end, said conduit being separate from the rotor cylindrical portion except where the first-named rotor port is formed, sealing inserts encircling the rotor near each end thereof and contacting with the inner cylindrical surface of the stator, additional sealing inserts disposed along the sides of the rotor port and contacting with the stator wall to cooperate with the circular inserts for forming a liquid tight fit between the registering rotor and stator ports, said rotor having additional sealing inserts paralleling the second-named inserts and extending along the sides of the unused stator ports, and means for swinging the rotor into the desired position, said rotor being split so as to urge the rotor wall into yielding contact with the stator wall at all times and thus effect a better contact between the inserts and the rotor wall, said split being located diametrically opposite the port in the cylindrical portion of the rotor, the stator ports never registering with the split.

5. A selector valve comprising a casing having a cylindrical portion with a plurality of ports in its wall, a rotor having a split sleeve revolvably mounted in the cylindrical portion for causing the rotor cylindrical wall to contact with the stator cylindrical wall in a yielding manner at all times, said rotor having a condut with a port movable into registration with the desired stator port, said conduit being separate from the split sleeve except where the rotor port is formed, the split being located diametrically opposite to the rotor port and automatically compensating for the expansion and contraction of metals caused by temperature changes from either internal or external sources, the casing ports never registering with the split.

6. A selector valve comprising a valve body having a cylindrical wall with a plurality of ports therein through which fluid can flow, the bottom of the valve body having an outlet through which fluid may flow, a valve rotor having a longitudinally split cylindrical portion adapted to be rotatably received in the cylindrical wall of the valve body, the split cylindrical rotor portion yieldingly contacting with the cylindrical wall of the valve body at all times, said valve rotor having a conduit with one end always registering with the valve body outlet, and the other end adapted to be swung into selective registration with any one of the desired ports in the cylindrical wall of the valve body, said conduit being separate from the rotor cylindrical portion except at end registering with valve body ports, sealing inserts on the valve rotor and encircling the end of the conduit that selectively registers with the ports, additional sealing inserts on the valve rotor for encircling and sealing the other ports not being used, whereby leakage from these ports to the conduit is prevented, the split in the rotor cylindrical portion being disposed diametrically opposite the conduit and that registers with the body ports, and means for swinging the valve rotor to align the conduit with the desired port, the body ports never registering with the split.

7. A selector valve comprising a valve body having a cylindrical wall with a plurality of ports therein through which fluid can flow, the bottom of the valve body having an outlet through which fluid may flow, a valve rotor having a longitudinally split cylindrical portion adapted to be rotatably received in the cylindrical wall of the valve body, the split cylindrical rotor portion yieldingly contacting with the cylindrical wall of the valve body at all times, said valve rotor having a conduit with one end always registering with the valve body outlet, and the other end adapted to be swung into selective registration with any one of the desired ports in the cylindrical wall of the valve body, said conduit being separate from the rotor cylindrical portion except at end registering with valve body ports, sealing inserts on the valve rotor and encircling the end of the conduit that selectively registers with the ports, additional sealing inserts on the valve rotor for encircling and sealing the other ports not being used, whereby leakage from these ports to the conduit is prevented, the split in the rotor cylindrical portion being disposed diametrically opposite the conduct and that registers with the body ports, means for swinging the valve rotor to align the conduit with the desired port, the body ports never registering with the split, and lugs integral with the valve rotor and disposed adjacent to the split in the cylindrical portion for being gripped to close the split when inserting the valve rotor in the valve body.

WILLIAM RODERICK DAND.